United States Patent
Larsson et al.

(10) Patent No.: US 10,848,961 B1
(45) Date of Patent: Nov. 24, 2020

(54) PROFILE DOWNLOAD TO ENTERPRISE MOBILE RADIO DEVICE

(71) Applicants: GIESECKE+DEVRIENT MOBILE SECURITY GMBH, Munich (DE); GIESECKE+DEVRIENT MOBILE SECURITY AMERICA, INC., Dulles, VA (US)

(72) Inventors: Thomas Larsson, Alvsjo (SE); Ivan De Figueiredo, Jr., Roswell, GA (US)

(73) Assignees: GIESECKE+DEVRIENT MOBILE SECURITY GMBH, Munich (DE); GIESECKE+DEVRIENT MOBILE SECURITY AMERICA, INC., Dulles, VA (US)

( * ) Notice: Subject to any disclaimer, the term of this patent is extended or adjusted under 35 U.S.C. 154(b) by 0 days.

(21) Appl. No.: 16/689,729

(22) Filed: Nov. 20, 2019

(51) Int. Cl.
| | |
|---|---|
| H04W 8/18 | (2009.01) |
| H04W 8/08 | (2009.01) |
| H04W 12/00 | (2009.01) |
| H04W 88/18 | (2009.01) |
| H04W 8/26 | (2009.01) |
| H04W 48/16 | (2009.01) |

(52) U.S. Cl.
CPC .............. *H04W 8/183* (2013.01); *H04W 8/08* (2013.01); *H04W 8/26* (2013.01); *H04W 12/0023* (2019.01); *H04W 48/16* (2013.01); *H04W 88/18* (2013.01)

(58) Field of Classification Search
CPC ... H04W 8/183; H04W 12/0023; H04W 8/08; H04W 8/26; H04W 48/16; H04W 88/18
See application file for complete search history.

(56) References Cited

U.S. PATENT DOCUMENTS

| | | | |
|---|---|---|---|
| 10,440,558 B1* | 10/2019 | De Figueiredo Junior ................ H04W 12/0027 |
| 2016/0020802 A1* | 1/2016 | Lee ...................... H04B 1/3816 455/558 |
| 2016/0057725 A1* | 2/2016 | Suh ........................ G06Q 50/30 455/435.1 |
| 2018/0060199 A1* | 3/2018 | Li ............................ G06F 21/45 |
| 2018/0270363 A1* | 9/2018 | Guday ............. H04M 15/8214 |
| 2018/0302781 A1* | 10/2018 | Lee ................... H04W 12/0609 |
| 2019/0028881 A1* | 1/2019 | Namiranian .... H04W 12/00401 |
| 2020/0112854 A1* | 4/2020 | Namiranian ......... G06K 7/1417 |

OTHER PUBLICATIONS

"RSP Technical Specification," GSM Association, Version 2.2, Sep. 1, 2017, 264 pages.

* cited by examiner

*Primary Examiner* — Dinh Nguyen
(74) *Attorney, Agent, or Firm* — Workman Nydegger

(57) ABSTRACT

A method for downloading a profile from a subscription management server (SM-DP+) to a security enclave comprised in an enterprise mobile radio device.

8 Claims, 2 Drawing Sheets

PROFILE DOWNLOAD TO ENTERPRISE MOBILE RADIO DEVICE

FIELD OF THE INVENTION

The invention relates to downloading a profile from a subscription management server to a security enclave of an enterprise mobile radio device.

BACKGROUND OF THE INVENTION

Mobile radio devices are broadly known and used by consumers particularly in the form of smartphones and tablet PCs or notebooks having a mobile radio interface.

A mobile radio device comprises at least one profile by which the mobile radio device authenticates itself for being provided with services in a radio network of a mobile network operator.

Profiles are contained in a mobile radio device within a security enclave for profiles of the mobile radio device. Security enclaves for profiles are presently in the market in the form of removable plug-in SIM cards or UICCs (UICC=Universal Integrated Circuit Card), and in the form of fixedly soldered-in eUICCs (embedded UICCs). Discussed form factors of security enclaves for profiles are security enclaves provided in a chip of the chipset of the mobile radio device.

According to SGP.22, a profile is "a combination of data and applications to be provisioned on an eUICC for the purpose of providing services". This definition more or less holds for any profile, also independently of SGP.22, and also for other form factors of a security enclave than the eUICC, such as the plug-in SIM card or UICC.

Sometimes profiles are also related to as eSIMs. Throughout this document, eSIM and profile are seen as synonymous to each other.

Profiles are known to be downloaded from a subscription management server to the security enclave, e.g. an eUICC, of a mobile end device. The procedure of providing a security enclave of a mobile radio device with a profile is also referred to as provisioning. [1] SGP.22 discloses as a subscription management server the data preparation plus server SM-DP+. The SM-DP+ fulfil two tasks: preparation of profiles ready to be sent to a security enclave, and sending profiles to security enclaves of mobile radio devices The download or provisioning of a profile as described in [1] SGP.22, chapter 3.1, and as shown in FIG. 1 of this document, implies steps of (i) Initialization (chapter 3.1.1), (ii) mutual authentication between SM-DP+ and eUICC (chapter 3.1.2) and (iii) Profile Download an Installation (chapter 3.1.3).

FIG. 2 shows profile provisioning or download as described in [1] SGP.22, chapter 3.1 in greater detail. The procedure of authentication is omitted in FIG. 2 and subsequent Figures since it is not essential to the invention. Steps 1, 2, 3 of FIG. 2 are meant to occur in this order: 1, 2, 3, or in the order 2, 1, 3.

As shown in FIG. 2, instances participating in profile provisioning or profile download according to SGP.22 are: an Operator or Mobile Network Operator MNO, a data preparation server SM-DP+ preparing profiles for the Operator, an eUICC as an embodiment of a security enclave for profiles, a Local Profile Assistant LPA which can be located either in the mobile radio device, as LPAd, or in the eUICC, as LPAe, and an End-User being holder of the mobile radio device.

The download initiation procedure (3.1.1) according to [1] SGP.22 consists of the following sub-processes:
A. Contract subscription process (shown as step 1 in FIG. 2 and FIG. 3)
B. Download preparation process
C. Contract finalization process (shown as step 2 in FIG. 2 and FIG. 3)
D. Subscription activation process (Optional).

During A, contract subscription process, step 1 in FIG. 2, the Operator acquires information required for a profile and its later download. As part of this data, the EID and IMEI of the target Device MAY be provided, and related Device capabilities MAY be acquired. The contract subscription process can be performed at an Operator's Point of Sale (POS), using the Operator's web portal from a Device which is not the one onto which the Profile will be downloaded (e.g. a PC) or from a web browser on the Primary Device, or even using a companion application on the Primary Device.

In step C, contract finalization process, step 2 in FIG. 2, the Operator provides the End-User with relevant Profile information necessary for the profile download, therein Profile trigger information for triggering a profile download. According to SGP.22, there are three options of Profile trigger information for triggering a profile download: (1) an Activation Code; (2) an Activation Code and a Confirmation Code; (3) if a SM-DS or a Default SM-DP+ is to be used for the Profile download, the Operator informs the End-User of the condition that triggers the Profile download procedure, e.g., the very first boot-up and/or IP connection of the device.

The Activation Code of options (1) and (2) can be provided to the End-User for example either as alpha-numeric code, or as a QR-code. The alpha-numeric code has to be entered by the End-User manually so as to trigger the Profile download procedure. The QR-code can be scanned by the End-User optically so as to trigger the Profile download procedure.

For enterprise mobile radio devices, the enterprise occurs as an additional participating instance. This scenario is shown in FIG. 3.

According to FIG. 3, an enterprise orders profiles for End-Users associated with the Enterprise, for example Employees of the Enterprise. Accordingly, SGP.22 step 3.1.1 Profile Download Initiation, A—Contract subscription is executed between the Operator MNO and the Enterprise, instead of between the Operator MNO and the End User. SGP.22 step 3.1.1 Profile Download Initiation, C—Contract finalization, sending of Profile Trigger Information, is executed from the SM-DP+ to the Enterprise, instead of from the SM-DP+ to the End-User. At same point in time after the Profile Trigger Information has been received at the Enterprise, an End-User associated with the Enterprise orders a profile at the Enterprise, herein indicating a User-Identifier of his own, for example his company ID or his company e-mail address, or both. In reply, as shown as step 3 in FIG. 3, the Enterprise forwards the Profile Trigger Information to the End-User, for example by e-mail or in paper form, for example as an alpha-numeric code or QR-code. According to Step 4 of FIG. 3, the End-User forwards the Profile Trigger Information to the SM-DP+, e.g. by scanning the received QR-code or by entering the received alpha-numeric code. In reply, the SM-DP+ supplies the requested profile to the security enclave (e.g. eUICC) of the End-User's mobile radio device.

In the process described above referring to FIG. 3, the End-User has to correctly request the profile at his Enterprise, and has to correctly forward the Profile Triger Information correctly to the SM-DP+. In both steps mistakes can occur. The result can be that a profile download is not started or aborted, and has to be started once again.

Therefore, the process described above referring to FIG. 3 for downloading a profile to an enterprise mobile radio device is cumbersome and borne to failure for the End-User associated with the Enterprise (e.g. Employee).

Objective of the Invention

It is an object of the present invention to provide a method for downloading a profile to an enterprise mobile radio device which reduces the risk of malfunction, particularly reduces the risk that profile downloads are aborted.

SUMMARY OF THE INVENTION

The object of the invention is achieved by the subject matter of the independent claims, namely claim 1 directed to an eSIM Device Enablement Service (eDES) Discovery Service (DS), eDES DS, claim 4 directed to a subscription management server (SM-DP+), claim 6 directed to an enterprise mobile radio device, and claim 10 directed to a method for executing a profile download from a subscription management server (SM-DP+) to a security enclave comprised in an enterprise mobile radio device. Embodiments of the invention are presented in dependent claims.

The eSIM Device Enablement Service Discovery Service eDES DS interfaces with both the enterprise mobile radio device and the subscription management server. At the side of the enterprise mobile radio device, the only required user interaction is to enter a user ID of a user associated with an enterprise mobile radio device, and ascertain that the user ID is provided to the eDES DS. The eDES DS, after having verified that a profile is available for the ordering user ID, orders profile download to the enterprise mobile radio device associated to the user ID directly at the subscription management server, e.g. SM-DP+. The SM-DP+ sends profile activation data for the ordered profile back to the eDES DS. Optionally, the eDES DS at this step also requests profile preparation at a BSS associated with or in the subscription management server infrastructure, and the BSS prepares the profile and the profile activation data in situ, activates billing and initiates network provisioning. The eDES DS forwards the received profile activation data to the enterprise mobile radio device that previously sent the user ID, into a device client of said enterprise mobile radio device. Said device client automatically forwards the profile activation data to the subscription management server to trigger profile download. The subscription management server finally sends the requested profile to the enterprise mobile radio device, more precisely to its security enclave.

After having sent his/her user ID to the eDES DS, the user is not required to execute any manual steps any more, particularly no entry of an alpha-numeric activation code or scanning of a QR-code. All steps of receiving, sending and forwarding of data elements, particularly of profile activation data, is done by the device client, and thus is not prone to human errors.

Accordingly, the present invention provides a method for downloading a profile to an enterprise mobile radio device which reduces the risk of malfunction, particularly reduces the risk that profile downloads are aborted.

According to some embodiments, in step (g) (6), the profile activation data is forwarded to a device client contained in the identified enterprise mobile radio device, and which device client is constructed to, upon receipt of the profile activation data, automatically forward the profile activation data to the subscription management server so as to trigger download of a profile to the security enclave comprised in an enterprise mobile radio device.

According to some embodiments, step (e) (5) further comprises initiating preparation of a profile at the subscription management server (SM-DP+), and wherein the activation data is related to the profile generated in reaction to said initiating. In contrary to previously known solutions, these embodiments imply an on-the-fly preparation (or generation) of profiles, only on demand when a profile is requested, in addition to the on-the-fly downloading of profile activation data.

According to some embodiments of an eDES DS or subscription management server SM-DP+ or device, the profile and the profile activation data are individual to the identified enterprise mobile radio device, or are individual to the security enclave included in said identified enterprise mobile radio device, or both.

According to some embodiments of an eDES DS or subscription management server, the user ID comprises or consists of an e-mail address of the user, or of a different ID suited to identify the user in the company.

According to some embodiments of an eDES DS or subscription management server, the security enclave is embodied as a plug-in SIM card or Universal Integrated circuit card (UICC) or as an embedded UICC, eUICC, or in one or several chips of a chipset of the enterprise mobile radio device.

Entry of the user ID by the user can be according to a first option directly to the mobile that in turn forwards it to the eDES DS. Alternatively, according to a second option, the user can enter the user ID to an Enterprise Mobile Device Management MDM system which receives the user ID entered by the user, forwards it to a device client contained in the user's enterprise mobile radio device for which a profile shall be requested, and the device client forwards the user ID to the eDES DS. The second option is shown in the embodiment of FIG. 4 shown as optional loop of steps 3a and 3b.

BRIEF DESCRIPTION OF THE DRAWINGS

Embodiments of the invention will now be described with reference to the accompanying drawings, throughout which like parts are referred to by like references, and in which represents.

DETAILED DESCRIPTION OF THE INVENTION

Instances involved in the Remote Provisioning at an enterprise side infrastructure are following. An enterprise as a legal entity. Enterprise MDM servers associated with said enterprise and installed to manage profiles intended for End-Users' Devices (e.g. Smartphones, Tablets). End-Users, for example Employees of the enterprise and/or persons otherwise related to the enterprise, said End-Users having a right to have a business Device associated with the enterprise, and End-Users' Devices. An eSIM Device Enablement Service (eDES) Discovery Service (DS), or briefly eDES DS.

Instances involved in the Remote Provisioning at the Mobile Network Operator (MNO) side infrastructure are following. An MNO sales instance providing both a legal entity, and an MNO sales server. An MNO Business Support System BSS, including one or several MNO servers, and allowing a sales person of MNO Sales to input of sales orders for profiles, manage billing of orders and customer care, and to instruct a SM-DP+ profile management server to order profiles corresponding to the sales order. An SM-DP+ profile management server, according to SGP.22, or with similar features, providing profiles for download to eUICCs hosted in Devices.

Step (1): similarly to prior art, the enterprise orders profiles for End-Users associated with the Enterprise, for example Employees of the Enterprise, at the MNO sales instance. According to the profile order, a contract between the enterprise and the MNO is established, and the enterprise is now associated to the MNO. In addition, the enterprise sends from the enterprise infrastructure to the MNO infrastructure ID one or several user IDs of users (End-Users) associated with respective enterprise mobile radio devices, and the MNO infrastructure receives the sent user IDs. The received user IDs are stored in one or several servers of the MNO infrastructure, e.g. in an MNO sales server or a server of the MNO Business Support System BSS.

Figure 1:
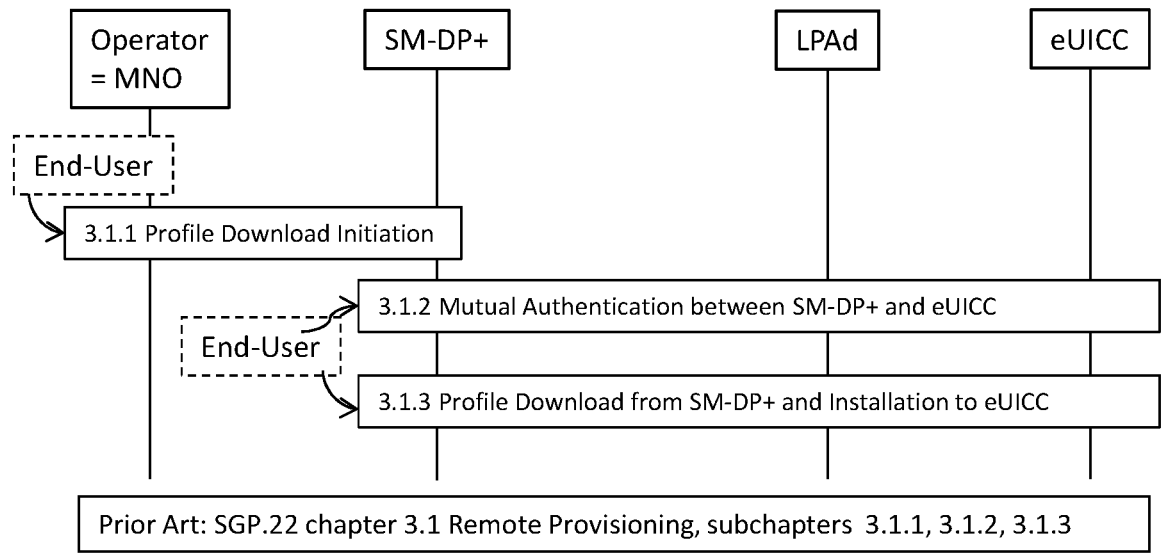
FIG. 1 a schematic representation of Remote Provisioning (including profile download), according to prior art SGP.22.
Figure 2:
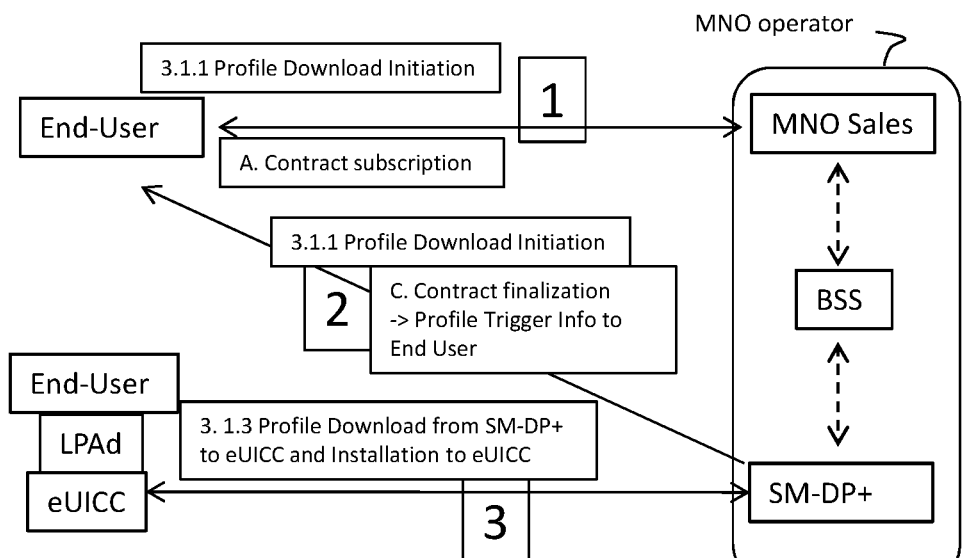
FIG. 2 a schematic representation of Remote Provisioning of a profile directly to an End-User, according to prior art SGP.22.
Figure 3:
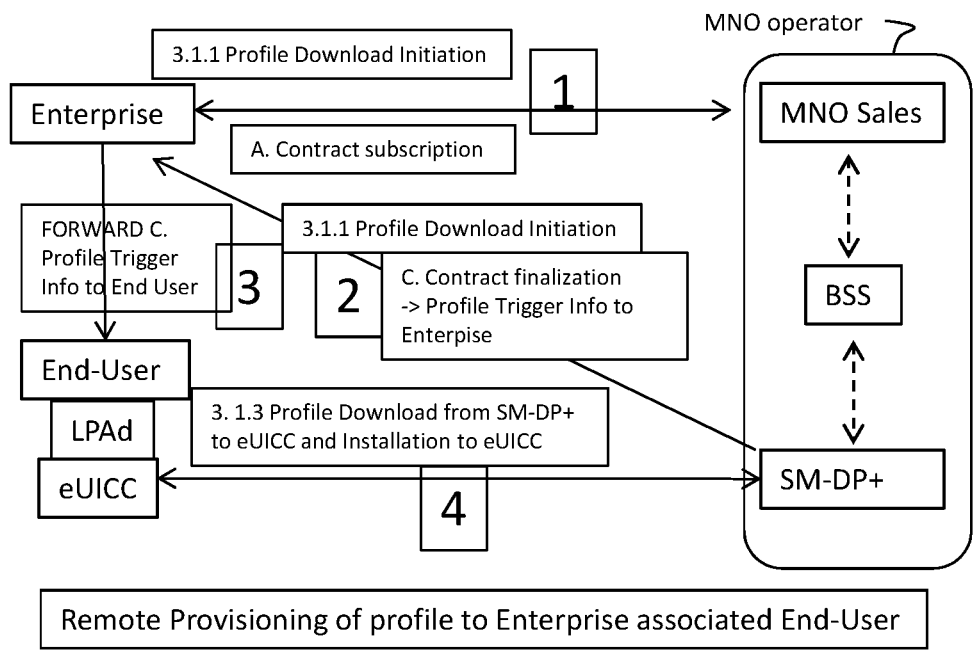
FIG. 3 a schematic representation of Remote Provisioning of a profile to an enterprise associated with an End-User, according to prior art SGP.22.
Figure 4:
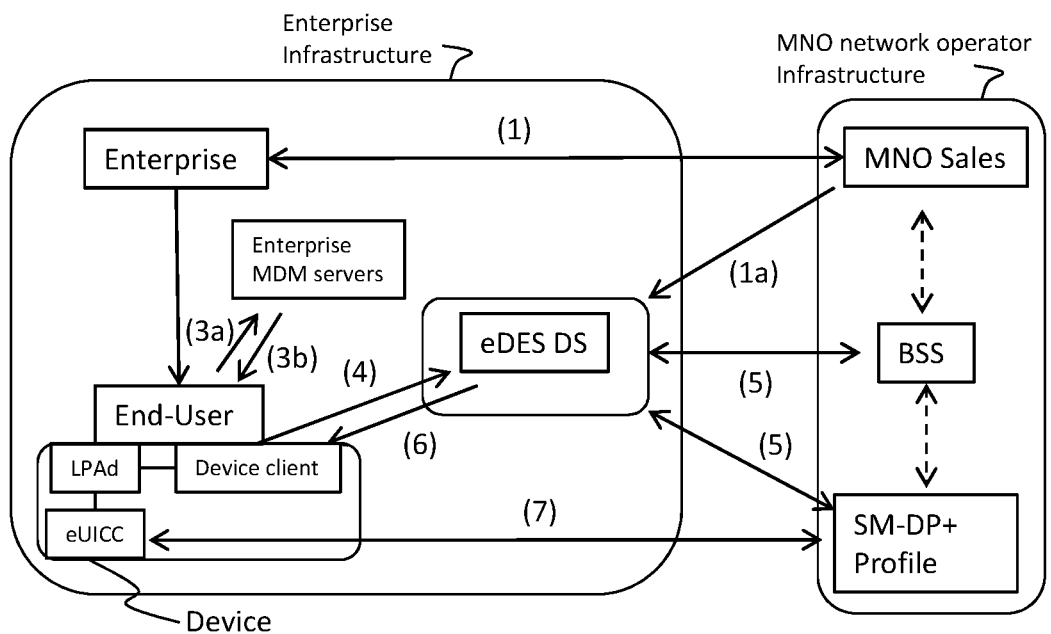
FIG. 4 a schematic representation of Remote Provisioning of a profile to an End-User associated with an enterprise, according to embodiments of the invention.

Different from prior art, there is no direct download of profile trigger information (e.g. Activation Codes, Matching IDs according to SGP.22) to the enterprise now, for pre-storage of profiles (this would be step (2) in the prior art solution of FIG. 3).

Step (1a): The MNO network operator infrastructure sends the one or several received user IDs to the eSIM Device Enablement Service (eDES) Discovery Service (DS), or briefly eDES DS. By this sending step (1a), the eDES is notified that profile orders are pending at the MNO and are ready to be downloaded from the MNO infrastructure to enterprise device eUICCs. From now on, the eDES DS is able to initiate fulfillment of profile orders entered into the eDES DS by an authorized enterprise End-User.

(Optional) Step (3a): At some point in time, which can be previous or subsequent to steps (1) and (1a), an End-User orders provisioning of a profile for his/her enterprise Device at the Enterprise MDM server. For this, the End-User enters an identifier to the Enterprise MDM server.

(Optional) Step (3b): The Enterprise MDM server authenticates the End-User and, if authentication is successful, provides to the End-User's Device, to the Device Client, an instruction to send the device ID to the eDES DS.

Alternative to (3a), (3b): the user manually initiates step (4).

Step (4): the Device sends the device ID to the eDES DS, and the eDES DS receives the user ID. The eDES DS verifies if the received user ID corresponds to a user ID for which in step (1) a profile was ordered, and if the two user IDs are the same user ID, so as to verify that the enterprise mobile radio device for which the user ID is entered in step (4) is identical to the an enterprise mobile radio device for which a profile was ordered in step (1), further referenced to as the identified enterprise mobile radio device.

Step (5): (b) The eSIM Device Enablement Service (eDES) Discovery Service (DS), eDES DS, sends to the SM-DP+ (5) a request for a profile download to the security enclave of the identified enterprise mobile radio device.

(c) The SM-DP+ provides profile activation data, which activation data, when sent to the subscription management server (SM-DP+), enable to trigger download of a profile from the subscription management server (SM-DP+) to a device.

(d) The SM-DP+ sends the profile activation data to the eDES DS.

In difference to previously known solutions, the profile activation data are provided from the SM-DP+ to the enterprise infrastructure—here to the eDES DS of the enterprise infrastructure—only on-the-fly when a profile for an End-User device is requested, however not in advance for storage and later handling of later profile requests.

The profile activation data can be for example an Activation Code (e.g. Matching ID) according to SGP.22.

Step (6): The eDES DS forwards the received profile activation data to a device client of the identified enterprise mobile radio device, so as to initiate the identified enterprise mobile radio device to request download of a profile from the subscription management server (SM-DP+).

Step (7): Upon receipt of the profile activation data at the device client of the identified enterprise mobile radio device, the device client automatically forwards the profile activation data to the subscription management server SM-DP+ so as to trigger download of a profile to the security enclave comprised in the identified enterprise mobile radio device.

Upon receipt of the profile activation data from the device client at the subscription management server SM-DP+, the profile is downloaded from the subscription management server SM-DP+ to the security enclave comprised in the identified enterprise mobile radio device.

The actual profile download procedure which follows thereafter can for example be essentially according to SGP.22, section 3.1.

CITED PRIOR ART

[1] SGP.22—RSP Technical Specification, V2.2, 1 Sep. 2017

The invention claimed is:

1. An eSIM Device Enablement Service (eDES) Discovery Service (DS), eDES DS, with therein a computer implemented method for initiating a download of a profile from a subscription management server (SM-DP+) comprised in a MNO network operator infrastructure to a security enclave comprised in an enterprise mobile radio device, the method comprising the steps performed at an eSIM Device Enablement Service (eDES) Discovery Service (DS), eDES DS:
  (a) (Ia) receiving, from the mobile network operator MNO server infrastructure, a first user ID of a user associated with a first enterprise mobile radio device,
  (b) (4) receiving a second user ID from a second enterprise mobile radio device,
  (c) verifying the first user ID and the second user ID are the same user ID, so as to verify that the first enterprise mobile radio device is identical to the second enterprise mobile radio device, further referenced to as the identified enterprise mobile radio device,
  (e) (5) requesting download of a profile from a subscription management server (SM-DP+) to the security enclave of the identified enterprise mobile radio device,
  (f) (5) receiving, from the subscription management server (SM-DP+), profile activation data of said profile for which download was requested, which activation data, when sent to the subscription management server (SM-DP+), enable to trigger download of said profile for which download was requested from the subscription management server (SM-DP+) to a device, (g) (6) forwarding the received profile activation data to a device client of the identified enterprise mobile radio device, so as to initiate the identified enterprise mobile radio device to request download of a profile from the subscription management server (SM-DP+).

2. The eDES DS according to claim 1, wherein in step (g) (6), the profile activation data is for-warded to a device client contained in the identified enterprise mobile radio device, and which device client is constructed to, upon receipt of the profile activation data, automatically forward the profile activation data to the subscription management server (SM-DP+) so as to trigger download of a profile to the security enclave comprised in an enterprise mobile radio device.

3. The eDES DS according to claim 1, wherein step (e) (5) further comprises initiating preparation of a profile at the subscription management server (SM-DP+), and wherein the activation data is related to the profile generated in reaction to said initiating.

4. The eDES DS according to claim 1, wherein the profile and the profile activation data are individual to the identified enterprise mobile radio device, or are individual to the security enclave included in said identified enterprise mobile radio device, or both.

5. The eDES DS according to claim 1, wherein the user ID comprised or consists of an e-mail address of the user.

6. The eDES DS according to claim 1, wherein the security enclave is embodied as a plug-in SIM card or Universal Integrated circuit card UICC or as an embedded UICC, eUICC, or in one or several chips of a chipset of the enterprise mobile radio device.

7. The eDES DS according to claim 1, wherein the security enclave is embodied as a plug-in SIM card or Universal Integrated circuit card UICC or as an embedded UICC, eUICC, or in one or several chips of a chipset of the enterprise mobile radio device.

8. A method for executing a profile download from a subscription management server (SM-DP+) comprised in a MNO network operator infrastructure to a security enclave comprised in an enterprise mobile radio device, the method comprising:

(a) (1) sending a first user ID of a user associated with a first enterprise mobile radio device from an enterprise associated with the user to the MNO network operator infrastructure, (b) (Ia) sending the first user ID from the MNO network operator infrastructure to an eSIM Device Enablement Service (eDES) Discovery Service (DS), eDES DS, (c) (4) sending a second user ID from a second enterprise mobile radio device to the eDES DS, (d) at the eDES DS, verifying the first user ID and the second user ID are the same user ID, so as to verify that the first enterprise mobile radio device is identical to the second enterprise mobile radio device, further referenced to as the identified enterprise mobile radio device, (e) (5) by the eDES, DS, requesting a profile download from the subscription management server (SM-DP+) to the security enclave of the identified enterprise mobile radio device, (f) (5) providing, at the subscription management server (SM-DP+), profile activation data of said profile for which download was requested, which activation data, when sent to the subscription management server (SM-DP+), enable to trigger download of said profile for which download was requested from the subscription management server (SM-DP+) to a device, (g) (5) sending the profile activation data from the subscription management server (SM-DP+) to the eDES DS, (h) (6) forwarding the profile activation data from the eDES DS to a device client contained in the identified enterprise mobile radio device, (i) (7) upon receipt of the profile activation data, by the device client of the enterprise mobile radio device, automatically forwarding the profile activation data to the subscription management server (SM-DP+) so as to trigger download of a profile to the security enclave comprised in the identified enterprise mobile radio device, (j) download of the profile from the subscription management server (SM-DP+) to the security enclave comprised in the identified enterprise mobile radio device.

* * * * *